United States Patent
Hada et al.

(10) Patent No.: US 10,147,395 B2
(45) Date of Patent: Dec. 4, 2018

(54) FIELD SEQUENTIAL IMAGE DISPLAY DEVICE

(75) Inventors: Makoto Hada, Niigata (JP); Yuichi Takahashi, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 789 days.

(21) Appl. No.: 14/347,542

(22) PCT Filed: Apr. 16, 2012

(86) PCT No.: PCT/JP2012/060203
§ 371 (c)(1),
(2), (4) Date: Mar. 26, 2014

(87) PCT Pub. No.: WO2013/046774
PCT Pub. Date: Apr. 4, 2013

(65) Prior Publication Data
US 2014/0232763 A1 Aug. 21, 2014

(30) Foreign Application Priority Data
Sep. 27, 2011 (JP) ................................ 2011-210042

(51) Int. Cl.
*G09G 3/34* (2006.01)
*G09G 5/18* (2006.01)
(Continued)

(52) U.S. Cl.
CPC .............. *G09G 5/18* (2013.01); *G03B 33/08* (2013.01); *G09G 3/001* (2013.01); *G09G 3/346* (2013.01);
(Continued)

(58) Field of Classification Search
None
See application file for complete search history.

(56) References Cited

U.S. PATENT DOCUMENTS

| 5,640,214 A | 6/1997 | Florence |
| 6,507,330 B1 | 1/2003 | Handschy et al. |

(Continued)

FOREIGN PATENT DOCUMENTS

| EP | 0 953 960 A1 | 11/1999 |
| EP | 1 091 343 A2 | 4/2001 |

(Continued)

OTHER PUBLICATIONS

International Search Report issued in Application No. PCT/JP2012/060203 dated May 22, 2012.

(Continued)

*Primary Examiner* — Jennifer Mehmood
*Assistant Examiner* — Parul H Gupta
(74) *Attorney, Agent, or Firm* — McDermott Will & Emery LLP (57) ABSTRACT

There has been room for improvement in terms of increasing the life of display elements which have occurrences of irreversible bright point defects and black point defects and shortened lives of display elements when DMDs, which are reflective display devices, are used in high temperature environments such as being installed in vehicles. In the present invention, a display control means displays a display image in display elements. An illumination control means drives various illumination means in each subframe into which a frame of the display image is temporally divided, by a field sequential system. The frame is provided with a display period in which the display image is displayed in the display elements by the display control means normally driving a plurality of pixels and the illumination control means driving the illumination means and a non-display period in which the display image is not displayed in the display elements by the display control means engaging in non-display period drive of the plurality of pixels and the illumination control means turning off the illumination means.

12 Claims, 10 Drawing Sheets

(51) Int. Cl.
  *H04N 9/31* (2006.01)
  *G03B 33/08* (2006.01)
  *G09G 3/00* (2006.01)
  *G09G 3/36* (2006.01)
  *G02B 27/01* (2006.01)

(52) U.S. Cl.
  CPC ............ *G09G 3/36* (2013.01); *H04N 9/3114* (2013.01); *G02B 27/01* (2013.01); *G02B 2027/014* (2013.01); *G09G 2310/0235* (2013.01); *G09G 2310/06* (2013.01); *G09G 2310/063* (2013.01); *G09G 2320/041* (2013.01); *G09G 2320/043* (2013.01); *G09G 2330/04* (2013.01); *G09G 2380/10* (2013.01)

(56) References Cited

U.S. PATENT DOCUMENTS

| | | | |
|---|---|---|---|
| 2002/0030674 A1 | 3/2002 | Shigeta | |
| 2002/0093480 A1* | 7/2002 | Mizutani | G09G 3/3406 345/102 |
| 2003/0132901 A1* | 7/2003 | Shimada | G02F 1/133528 345/87 |
| 2007/0241417 A1* | 10/2007 | Huibers | G02B 26/0841 257/436 |

FOREIGN PATENT DOCUMENTS

| | | |
|---|---|---|
| JP | 8-195963 A | 7/1996 |
| JP | 2000-200063 A | 7/2000 |
| JP | 2002-251163 A | 9/2002 |
| JP | 2003-295156 A | 10/2003 |
| JP | 2009-109711 A | 5/2009 |
| JP | 5-193400 A | 5/2013 |

OTHER PUBLICATIONS

Extended European Search Report issued in corresponding European Patent Application No. 12836354.6, dated Apr. 13, 2015; 2 pages.

* cited by examiner

(a) $T \leq T1$ (b) $T1 < T < T2$ (c) $T2 \leq T$ (d) $T1 < T < T2$ (Illumination control and Display control)

(a) Flowchart relating to increase precedence mode Md (b) Flowchart relating to decrease precedence mode Me

FIELD SEQUENTIAL IMAGE DISPLAY DEVICE

CROSS-REFERENCE TO RELATED APPLICATIONS

The present application is the U.S. National Phase of PCT/JP2012/060203 dated Apr. 16, 2012, which claims priority from Japanese Patent Application No. 2011-210042 filed Sep. 27, 2011; the subject matter of each is incorporated herein by reference in entirety.

TECHNICAL FIELD

The present invention relates to a field sequential image display apparatus which displays an image using a field sequential drive method.

BACKGROUND ART

Heretofore, various kinds of vehicular head-up display apparatus, each of which displays a virtual image by projecting a display image on a windshield, or a semi-transmissive plate called a combiner, of a vehicle, have been proposed, and there is one disclosed in, for example, PTL 1. A vehicular head-up display apparatus 100 is disposed in the dashboard of a vehicle, and a display image D which the vehicular head-up display apparatus 100 projects is reflected from a windshield 200 to a vehicle operator 250, and the vehicle operator 250 can visually recognize a virtual image V superimposed on a landscape (refer to FIG. 1).

As this kind of vehicular head-up display apparatus, one using a field sequential drive method is proposed by the present applicant, and disclosed in PTL 2.

Such a head-up display apparatus, including illumination means, formed of a plurality of light emitting elements having different emission colors, which transilluminates a liquid crystal display element; and control means which controls the luminance of the light emitting elements, carries out an image display using a field sequential drive method whereby the light emitting elements with different emission colors are sequentially turned on, one for each of sub-frames into which is time divided a frame forming an image, and controls the transmittance of the light emitting elements in accordance with the transmittance of the liquid crystal display element, thus substantially uniforming the luminance of light transmissive through the liquid crystal display element.

Also, as an indicator using the field sequential drive method, one using a DMD (Digital Micro-mirror Device) which is a reflective display element is known, and disclosed in PTL 3. Each mirror of the DMD reflects light projected from a light source based on a video signal from the exterior, thus realizing a high resolution display.

CITATION LIST

Patent Literature

PTL 1: JP-A-5-193400
PTL 2: JP-A-2009-109711

SUMMARY OF INVENTION

Technical Problem

When using the DMD which is a reflective display device in high-temperature environment such as on a vehicle, however, when the display element is driven in the same way as in normal-temperature environment, each mirror of the display element is fixed in a constant state of either ON or OFF, thus leading to an occurrence of an irreversible luminescent spot defect or black spot defect, and thus to a decrease in the life span of the display element, and there is room for improvement in an increase in the life span of the display element.

Therefore, the invention, bearing in mind the previously described problem, provides a field sequential image display apparatus wherein it is possible to increase the life span of a display element even when the display element is used in high-temperature environment.

Solution to Problem

In order to solve the previously described problem, in a first aspect of the invention, a field sequential image display apparatus includes a display element, having a plurality of pixels, which displays a display image;

display control means which controls the plurality of pixels;

first illumination means which illuminates the display element with a first emission color;

second illumination means which illuminates the display element with a second emission color;

illumination control means which drives the first illumination means and second illumination means using a field sequential method for each of sub-frames into which a frame of the display image is time divided; and a control unit which inputs display image data of the display image from the exterior, and based on the display image data, controls the display control means and illumination control means, wherein the frame includes a display period in which the display control means causes a normal drive of the plurality of pixels, and the illumination control means drives the first illumination means and second illumination means, thereby causing the display element to display the display image; and a non-display period in which the display control means causes a non-display period drive of the plurality of pixels, and the illumination control means turns off the first illumination means and second illumination means, thereby not causing the display element to display the display image.

Also, in a second aspect of the invention, the non-display period drive is such that each of the plurality of pixels is ON/OFF controlled in a predetermined cycle.

According to such a configuration, it is possible to cause an observer to perform an ON/OFF operation of the pixels of the display element which does not relate to the display image, in the non-display period, while causing the observer to visually recognize the display image, it is possible to reduce a burden on the hinge of each pixel of the display element (on the fulcrum of the display element), and it is possible to suppress an occurrence of a luminescent spot defect or black spot defect, and keep the life span of the display element long.

Also, in a third aspect of the invention, the non-display period drive is such that each of the plurality of pixels is ON/OFF controlled so that an ON period and OFF period of each of the plurality of pixels in the frame are approximately equal to each other.

Also, in a fourth aspect of the invention, the non-display period drive is such that each of the plurality of pixels is ON/OFF controlled at an ON/OFF ratio wherein the ON/OFF ratio of each of the plurality of pixels in the display period is inverted.

Also, in a fifth aspect of the invention, the non-display period drive is such that an ON/OFF control in the normal drive is inverted.

According to these kinds of configurations of the third to fifth aspects of the invention, it is possible to equalize a burden caused by the ON control, and a burden caused by the OFF control, on the hinge of each pixel of the display element (on the fulcrum of the display element), and it is possible to suppress an occurrence of a luminescent spot defect or black spot defect, and keep the life span of the display element long.

Also, in a sixth aspect of the invention, the field sequential image display apparatus further includes temperature detection means which detects a temperature and outputs temperature data to the control unit, wherein when the temperature data are equal to or more than a first threshold, the display period and non-display period are provided in the frame.

According to such a configuration, by providing the non-display period only in high-temperature environment, it is possible to reduce a burden on the hinge of each pixel of the display element (on the fulcrum of the display element), and it is possible to suppress an occurrence of a luminescent spot defect or black spot defect, and keep the life span of the display element long.

Also, in a seventh aspect of the invention, the control unit gradually changes a non-display proportion which is the proportion of the non-display period in the frame period, in accordance with the temperature data, based on control characteristics wherein the non-display proportion and temperature data are correlated in advance.

There has been fear that when the temperature data T increase to equal to or more than the first threshold T1, the non-display proportion changes drastically from 0% to a preset proportion such as 50%, due to which the display luminance of the display apparatus changes drastically from 100% to approximately 50%, thus giving a vehicle operator a feeling of strangeness, but according to the seventh aspect of the invention, the display luminance also changes gently by causing the non-display proportion to change gradually, and it is possible to reduce a feeling of strangeness due to a change in the display luminance visually recognized by the vehicle operator. (Refer to FIG. 12)

Also, in an eighth aspect of the invention, the control unit switches the mode to a first regulation mode when the temperature data increase from equal to or less than the first threshold to equal to or more than the first threshold, and switches the mode to a second regulation mode when the temperature data decrease from equal to or more than a second threshold higher in temperature than the first threshold to equal to or less than the second threshold, the control unit, in the first regulation mode, does not cause the non-display proportion to decrease to less than the non-display proportion at the first threshold even when the temperature data are equal to or less than the first threshold, and the control unit, in the second regulation mode, does not cause the non-display proportion to increase to a value greater than the non-display proportion at the second threshold even when the temperature data are equal to or more than the second threshold. According to such a configuration, when the temperature data fluctuate in the vicinity of the thresholds in the sixth and seventh aspects of the invention, it is possible to reduce the fluctuation of the display luminance due to the fluctuation of the temperature data.

Also, in a ninth aspect of the invention, the control unit includes hysteresis control characteristics wherein the locus of control characteristics in the first regulation mode is different from the locus of control characteristics in the second regulation mode. By imparting hysteresis to the control characteristics in this way, it is possible to reduce the fluctuation of the display luminance due to the fluctuation of the temperature data in the vicinity of the thresholds.

Also, in a tenth aspect of the invention, the control unit switches the mode to an increase precedence mode when the temperature data increase from equal to or less than the first threshold to equal to or more than the first threshold, and switches the mode to a decrease precedence mode when the temperature data decrease from the second threshold higher in temperature than the first threshold to equal to or less than the second threshold, the control unit, in the increase precedence mode, causes the non-display proportion to increase based on the increase of the temperature data, and does not cause the non-display proportion even when the temperature data decrease, and the control unit, in the decrease precedence mode, causes the non-display proportion to decrease based on the decrease of the temperature data, and does not cause the non-display proportion to increase even when the temperature data increase. According to such a configuration, when the temperature data remain static between the first threshold and second threshold, it is possible to reduce the fluctuation of the display luminance due to the fluctuation of the temperature data.

Also, in an eleventh aspect of the invention, the OFF period of each of the plurality of pixels in the frame is longer than the ON period of each of the pixels.

Also, in a twelfth aspect of the invention, the non-display period is longer than the display period.

In this way, the OFF period needed for the hinge of each pixel of the display element (for the fulcrum of the display element) is slightly longer than the ON period, thereby enabling a reduction of the possibility that each pixel is fixed in the ON period even in the event that a fixation of each pixel occurs, owing to which it is possible to suppress an occurrence of particularly a luminescent spot defect, and suppress a decrease in concentration due to the observer keeping close watch on the luminescent spot defect (display).

Advantageous Effects of Invention

The invention provides a field sequential image display apparatus wherein a burden on the display element is reduced by providing the display element with the non-display period, thereby enabling the life span of the display element to increase, and a drastic change in luminance is eliminated in high-temperature environment, thus giving no feeling of strangeness to the vehicle operator.

DESCRIPTION OF EMBODIMENTS

Hereafter, a description will be given, based on the accompanying drawings, of an embodiment wherein the invention is applied to a vehicular head-up display apparatus 100.

Figure 1:
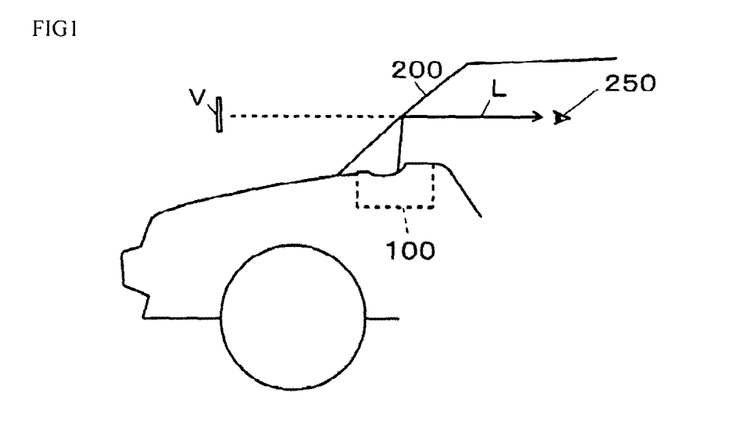
FIG. 1 is an overview diagram in an embodiment of the invention.

FIG. 1 is a diagram showing an overview when the head-up display device 100 which is the embodiment of the invention is mounted on a vehicle. The head-up display apparatus 100, being provided in a dashboard of the vehicle, is such that display light L representing a created display image D is reflected by a windshield 200, thereby causing a vehicle operator 250 to visually recognize a virtual image V of the display image D representing vehicle information. The vehicle operator 250 can visually recognize the virtual image V without turning his/her eyes away from the front.

Figure 2:
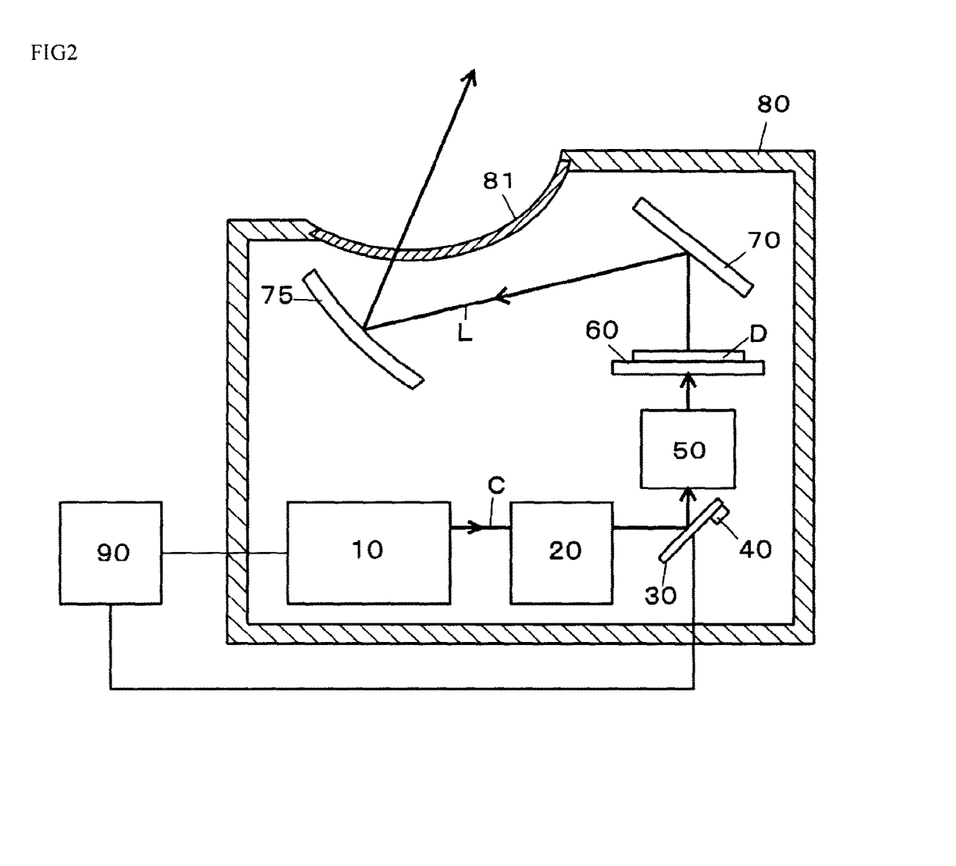
FIG. 2 is a sectional view of a display apparatus showing the heretofore mentioned embodiment.

FIG. 2 is a configuration diagram of the head-up display apparatus 100 which is the embodiment of the invention. The head-up display apparatus 100 includes an illumination device 10, an illumination optical system 20, a display element 30, temperature detection means 40, a projection optical system 50, a screen 60, a plane mirror 70, a concave mirror 75, a housing 80 having a window portion 81 through which the display image D is emitted, and a control unit 90.

Figure 3:
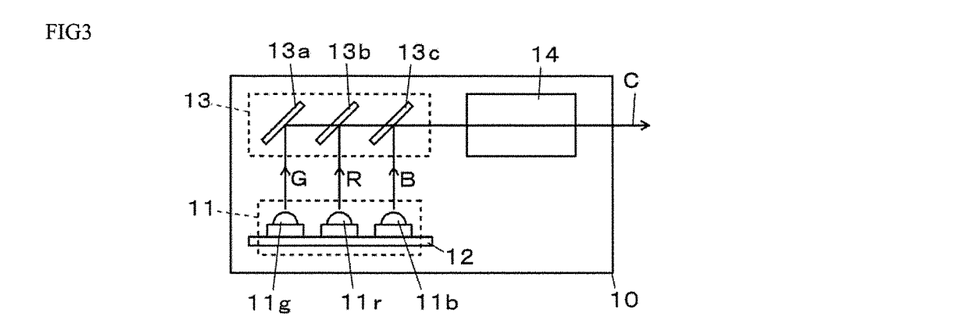
FIG. 3 is a conceptual diagram of an illumination device which generates illumination light of the heretofore mentioned embodiment.

The illumination device 10 includes illumination means 11, a circuit substrate 12, formed of an aluminium substrate, on which the illumination means 11 is mounted, reflection and transmission optical means 13, and luminance unevenness reduction optical means 14, as shown in FIG. 3.

The illumination means 11 is configured of a red diode (first illumination means) 11r which emits red light R, a green diode (second illumination means) 11g which emits green light G, and a blue diode (third illumination means) 11b which emits blue light B.

The reflection and transmission optical means 13 is formed of a reflecting mirror 13a, which reflects light, and dichroic mirrors 13b and 13c, each configured of a mirror on the surface of which a thin film such as a dielectric multilayer is formed, which carry out transmission and reflection of light.

The reflecting mirror 13a, being disposed at a predetermined angle on a side in a direction in which the light G emitted from the green diode 11g travels, reflects the light G.

The dichroic mirror 13b, being disposed at a predetermined angle on a side in a direction in which the light R emitted from the red diode 11r travels, transmits the light G reflected by the reflecting mirror 13a and reflects the light R.

The dichroic mirror 13c, being disposed at a predetermined angle on a side in a direction in which the light B emitted from the blue diode 11b travels, transmits the light R and light G transmitted and reflected by the dichroic mirror 13b and reflects the light B.

The luminance unevenness reduction optical means 14, being formed of a mirror box, an array lens, and the like, reduces the unevenness of light by diffusely reflecting, scattering, and refracting the heretofore described illumination light C. In this way, the illumination device 10 emits the illumination light C in the direction of the illumination optical system 20 to be described hereafter.

The illumination optical system 20, being configured of, for example, a concave lens, adjusts the illumination light C emitted from the illumination device 10 to the size of the display element 30 to be described hereafter.

The display element 30 is formed of a DMD (Digital Micro-mirror Device) including movable micromirrors, wherein two states ON and OFF are imparted by driving an electrode provided in a lower portion of each micromirror for a very short time of microsecond order, and it is thereby possible to incline the surface of each micromirror at ±12 degrees with its hinge as the fulcrum. Each mirror, when in the ON state, is inclined at +12 degrees with its hinge as the fulcrum, and reflects the illumination light C, emitted from the illumination optical system 20, in the direction of the projection optical system 50 to be described hereafter. Each mirror, when in the OFF state, is inclined at −12 degrees with its hinge as the fulcrum, and does not reflect the illumination light C in the direction of the projection optical system 50. Consequently, the display image D is projected in the direction of the projection optical system 50 by driving each mirror individually.

When the vehicular head-up display apparatus 100 is powered off, each mirror of the display element 30 is returned to the middle point between the inclination in the ON control and the inclination in the OFF control, and in this embodiment, the drive is stopped in a position of 0 degrees.

The projection optical system 50 is an optical system, configured of, for example, a concave lens or a convex lens, for effectively irradiating the screen 60, to be described hereafter, with the display light L of the display image D projected from the display element 30.

The screen 60, being configured of a diffusion plate, a holographic diffuser, a microlens array, and the like, receives on the lower surface the display light L from the projection optical system 50, and displays the display image D on the upper surface.

The plane mirror 70 reflects the display image D displayed on the screen 60 toward the concave mirror 75 to be described hereafter.

The concave mirror 75, being a concave mirror, or the like, by reflecting from the concave surface the display light L reflected by the plane mirror 70, emits the reflected light toward the window portion 81 to be described hereafter. By so doing, the formed virtual image V increases to a size to which the display image D displayed on the screen 60 is enlarged.

The housing 80, being formed from hard resin or the like, is formed into a box including the window portion 81 of a predetermined size in an upper portion. The housing 80 houses in predetermined positions the illumination device 10, illumination optical system 20, display element 30, temperature detection means 40, projection optical system 50, screen 60, plane mirror 70, concave mirror 75, and the like.

The window portion 81, being formed in a curved shape from translucent resin such as acrylic resin, is mounted in an opening portion of the housing 80 by welding or the like. The window portion 81 transmits the light reflected from the concave mirror 75.

Figure 4:
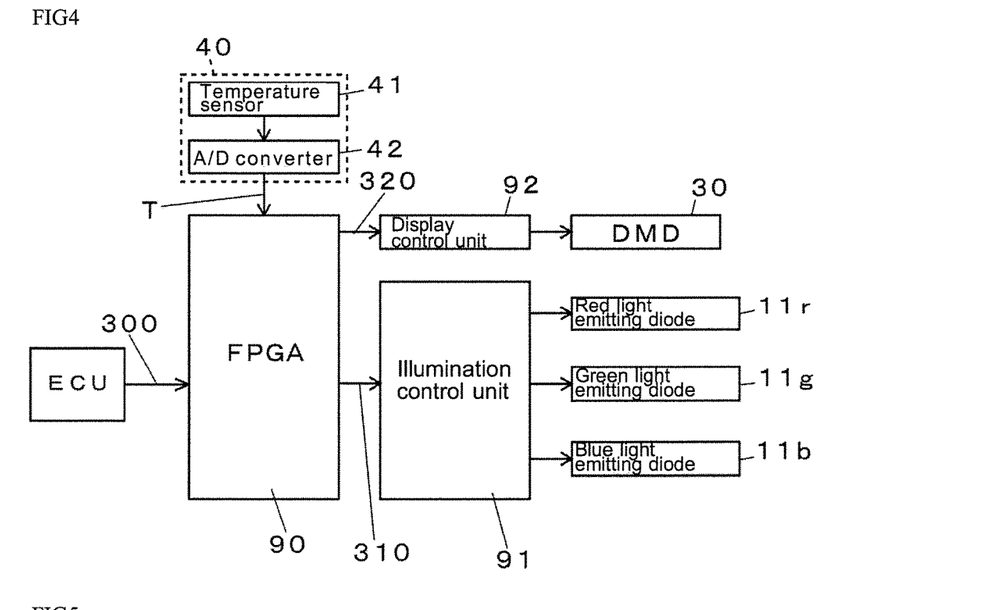
FIG. 4 is an electrical configuration illustration of the heretofore mentioned embodiment.
Figure 5:
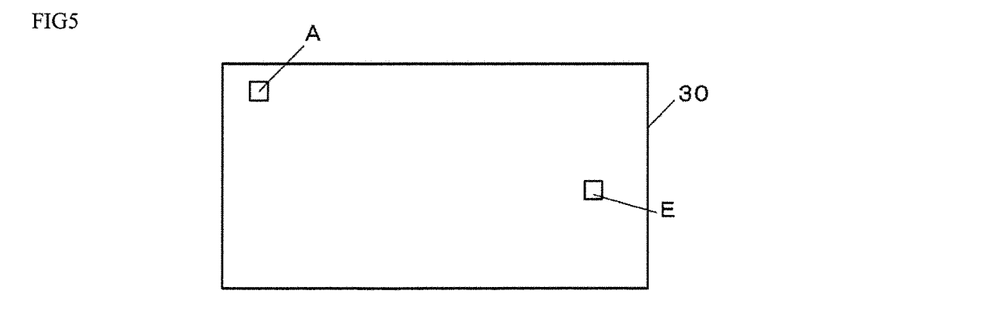
FIG. 5 is a schematic diagram of fields in a display element of the heretofore mentioned embodiment.
Figure 6:
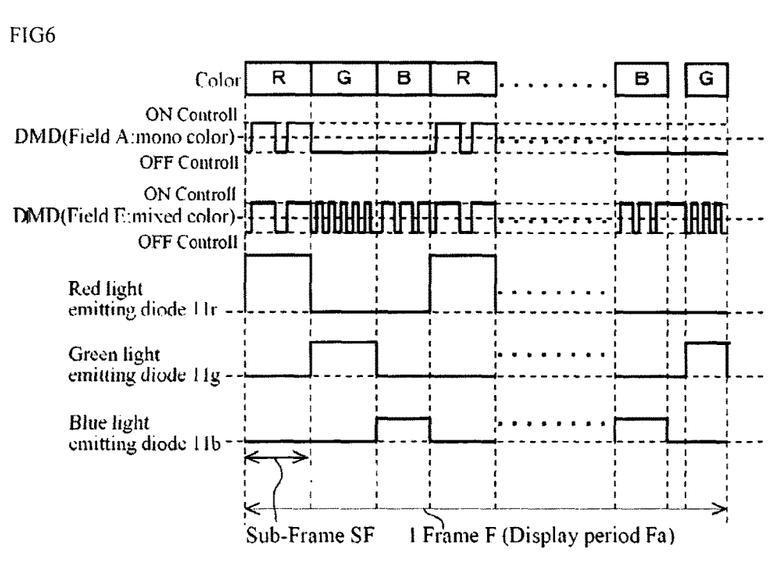
FIG. 6 is a schematic time chart of a field sequential drive of the heretofore mentioned embodiment.

Next, a description will be given, using FIGS. 4 to 6, of an electrical configuration of the head-up display apparatus 100. FIG. 4 is an electrical configuration illustration of the display apparatus of this embodiment, FIG. 5 is a schematic diagram of fields (pixels) of the display element 30 (DMD) of this embodiment, and FIG. 6 is a schematic time chart of a field sequential drive of this embodiment.

The control unit 90, being configured of an FPGA (Field Programmable Gate Array), is such that a video signal 300 for displaying the display image D is input from the exterior by an LVDS (Low Voltage Differential Signal) communication or the like, and illumination control data 310 for controlling the illumination device 10 at a light luminance and emission timing required by the video signal 300, and furthermore, display control data 320 for causing the display element 30 to display the display image D required by the previously mentioned video signal 300, are output respectively to an illumination control unit 91 and a display control unit 92, thereby controlling the output operation of the display image D in the head-up display apparatus 100.

A frame F which is a cycle in which the display image D is displayed is configured of sub-frames SF wherein the frame F is divided into a plurality of time periods.

The illumination control unit 91 controls the illumination device 10 using a field sequential drive method which causes the light emitting diodes 11r, 11g, and 11b of different colors to switch sequentially, one for each of the previously mentioned sub-frames SF, at high speed at a light intensity and timing required by the illumination control data 310.

The display control unit 92, based on the display control data 320, ON/OFF controls each mirror of the display element 30 using a PWM method (by changing an ON time ratio) or the like, and reflects the lights R, G, and B, emitted from the illumination device 10, in the direction of the screen 60, thereby depicting the display image D in full color utilizing colors mixed by an additive mixing method with the light emitting diodes 11r, 11g, and 11b as basic colors.

To give a simple description of an operation of the head-up display apparatus 100 of the above configuration, (1) The control unit 90 creates the illumination control data 310 and display control data 320 based on the video signal 300 from the exterior.

(2) The illumination device 10, based on the illumination control data 310, emits the illumination light C to the display element 30 using the field sequential drive method.

(3) The display element 30, based on the display control data 320, ON/OFF controls each mirror of the display element 30, thereby projecting the illumination light C from the illumination device 10 toward the screen 60 as the display image D.

(4) The display light L representing the display image D displayed on the screen 60 is reflected toward the concave mirror 75 by the plane mirror 70.

(5) The display image D is enlarged to a predetermined size by the concave mirror 75, the display light L representing the enlarged display image D is reflected by the windshield 200, and the virtual image V of the display image D is thereby formed on the front of the windshield 200. In this way, the head-up display apparatus 100 enables the vehicle operator 250 to visually recognize the display image D as the virtual image V.

Hereafter, a description will be given of a control method based on temperature data T of the head-up display apparatus 100.

The temperature detection means 40 is configured of a temperature sensor 41, formed of a thermistor or the like incorporated in the ceramic portion of the base substrate of the display element 30, and an A/D converter 42, wherein the temperature sensor 41 measures the temperature of the display element 30, analogue data output from the temperature sensor 41 is converted to digital data by the A/D converter 42, and the temperature data T are output to the control unit 90. The A/D converter 42 may be incorporated in the control unit 90.

Also, the temperature sensor 41 may measure the temperature in or around the housing 80 which affects the temperature of the display element 30, rather than measuring the temperature of the display element 30.

Also, the temperature sensor 41 may be disposed on a control substrate (not shown) on which the control unit 90 is mounted, and measure the temperature of the display element 30 remotely from on the control substrate.

The period of the previously mentioned frame F includes a display period Fa in which to cause a normal drive of each mirror of the display element 30 and a non-display period Fb in which to cause a non-display period drive, and the proportion of the non-display period Fb in the frame F period is taken to be a non-display proportion P.

The display period Fa is a period in which the illumination device 10, based on the illumination control data 310, emits the display image D in the direction of the display element 30 using the field sequential drive method, and the display element 30, based on the display control data 320, ON/OFF controls each mirror of the display element 30, thereby projecting the illumination light C from the illumination device 10 toward the screen 60 as the display image D, as heretofore described.

In the non-display period Fb, the non-display period drive which turns off the illumination device 10 and ON/OFF controls each mirror of the display element 30 in a predetermined cycle is carried out.

Figure 9:
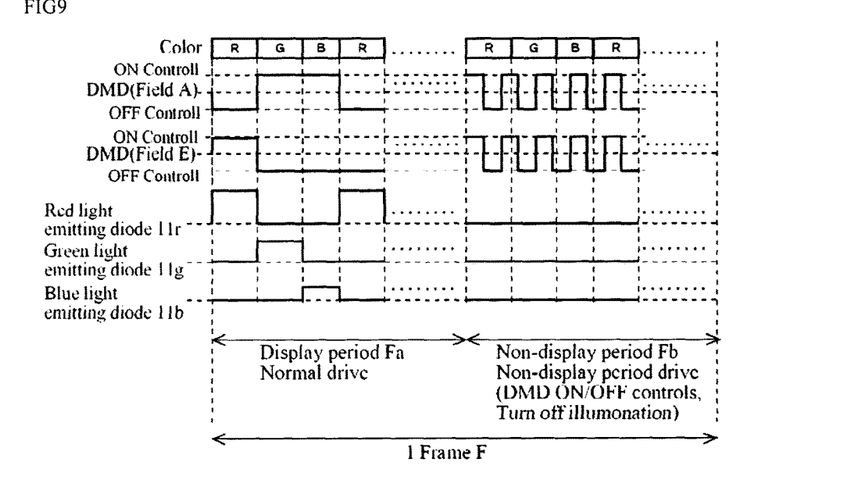
FIG. 9 is an illustrative time chart of the non-display period of the heretofore mentioned embodiment.

The non-display period drive is such that each mirror of the display element 30 is ON/OFF controlled in a predetermined cycle and, for example, as shown in FIG. 9, each field A and E of the display element 30 is ON/OFF controlled based on a program preset in the control unit 90 regardless of the condition of the normal drive in the display period Fa.

According to such a configuration, as each mirror of the display element 30 is ON/OFF controlled in a predetermined cycle, it is possible to prevent each mirror from being fixed in the ON or OFF state.

Figure 10:
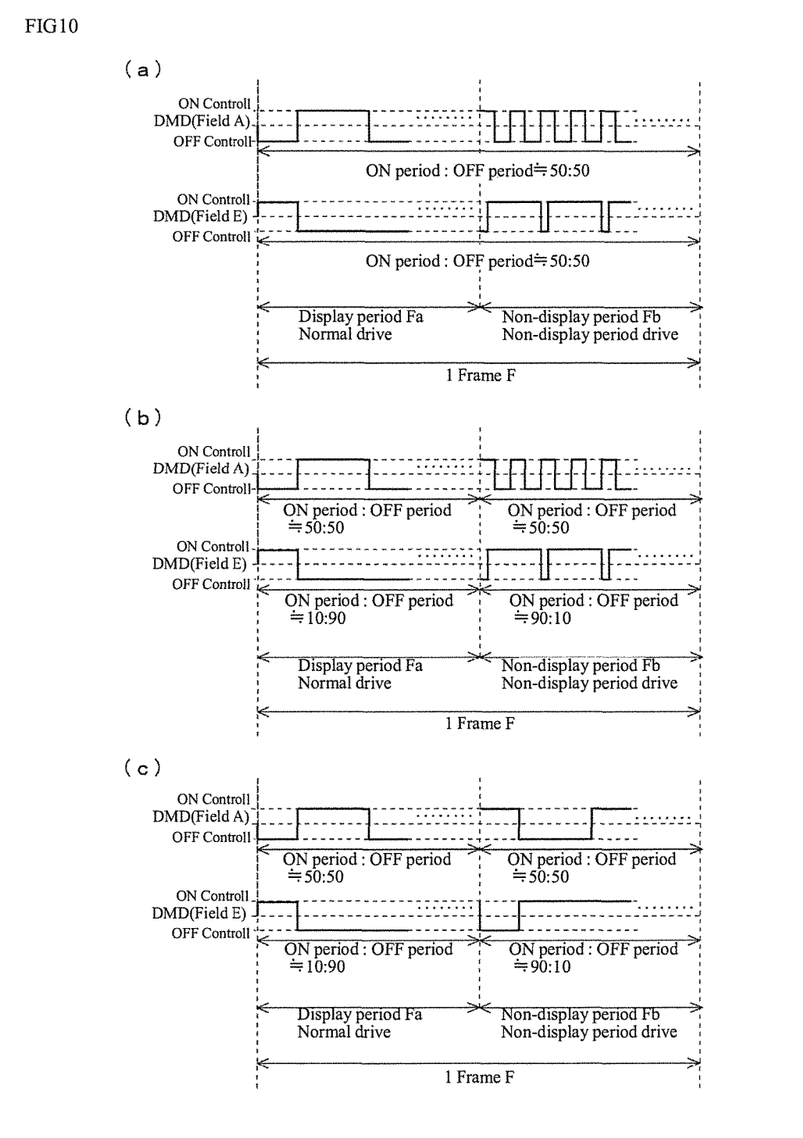
FIG. 10 illustrates time charts showing modification examples of the non-display period of the heretofore mentioned embodiment.

Also, as shown in FIG. 10 (*a*), the ON period and OFF period of each mirror in the display period Fa may be calculated, the ON period and OFF period of each mirror in the non-display period Fb be calculated from results of the calculation so that the ON period and OFF period in the frame F are approximately equal to each other (ON period: OFF period≈50:50), and the non-display period drive be carried out based on results of the calculation.

Also, as shown in FIG. 10(*b*), in the event that the proportion of the ON period to OFF period in the display period Fa is 10:90, the non-display period drive may be carried out at an ON/OFF ratio wherein the ON/OFF ratio of each mirror in the display period Fa is inverted so that the proportion of the ON period to OFF period in the non-display period Fb is set to be 90:10.

Also, as shown in FIG. 10(*c*), the ON/OFF control of the normal drive in the display period Fa may be inversion driven. The inversion drive is such that an OFF drive is carried out in the non-display period Fb at timings at which the display element 30 has been ON driven in the display period Fa, while the ON drive is carried out in the non-display period Fb at timings at which the display element 30 has been OFF driven in the display period Fa. That is, pulses in the non-display period Fb are pulses wherein pulses whose pulse width is the same as, or reduced or enlarged compared with, that of pulses in the display period Fa are ON/OFF inverted.

According to such a configuration, it is possible to approximately equalize the ON period and OFF period per frame of each mirror of the display element, and it is possible to prevent each mirror from being fixed in the ON or OFF state.

Figure 7:
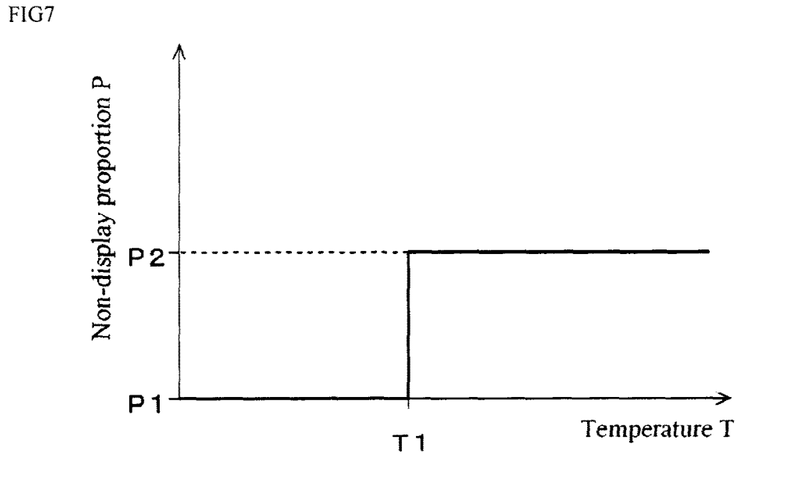
FIG. 7 is a control characteristic diagram of a non-display period and temperature data of the heretofore mentioned embodiment.

As shown in FIG. 7, when it is determined that the temperature data T are less than a preset first threshold T1, the control unit 90 sets the non-display proportion P to 0 and carries out only the normal drive without providing the non-display period Fb in the frame F period.

Figure 8:
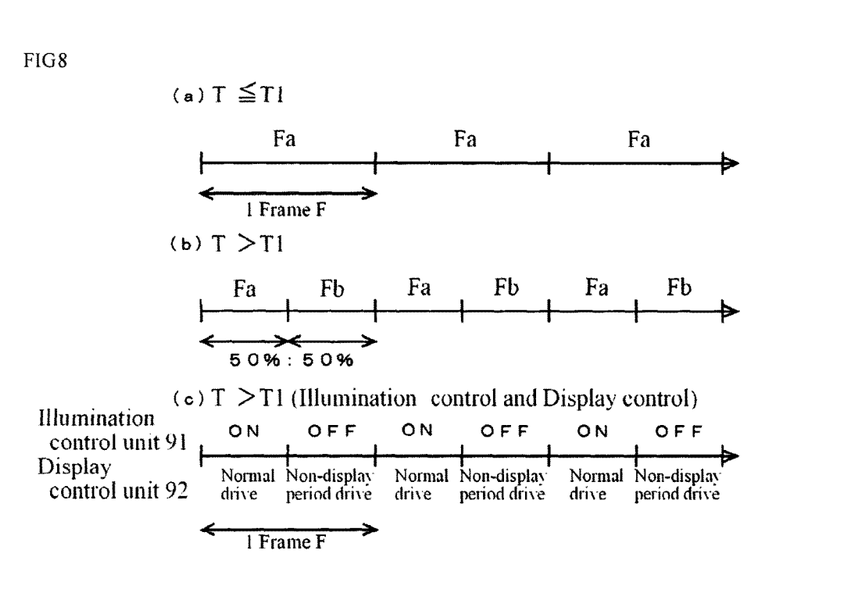
FIG. 8 illustrates the non-display period of the heretofore mentioned embodiment.

When it is determined that the temperature data T are equal to or more than the preset first threshold T1, the non-display proportion P in the frame F period is set to a second threshold non-display proportion P2, the display period Fa and non-display period Fb are provided in the frame F period, as shown in FIG. 8, and the non-display period drive is carried out after the normal drive, as shown in FIG. 8. It is desirable that the second threshold non-display proportion P2 is set so that the ON period and OFF period of each mirror of the display element 30 are approximately equal to each other.

According to such a configuration, when the temperature data T are equal to or more than the preset first threshold T1, each pixel of the display element 30 is such that a period in which each pixel has been ON driven, and a period in which each pixel has been OFF driven, in a period of a frame frequency F are approximately equal to each other, meaning that it is possible to reduce a burden on the hinge of each pixel of the display element 30 (on the fulcrum of the display element 30), and it is possible to suppress an occurrence of a luminescent spot defect or black point defect, and keep the life span of the display element 30 long even when using the display element 30 in high-temperature environment.

Also, in the heretofore described embodiment, the non-display period Fb is provided when the temperature data T are equal to or more than the first threshold T1, but may be provided so as to be constant regardless of the temperature.

Also, in the heretofore described embodiment, the ON period and OFF period of each pixel in the frame are set to be approximately equal to each other, but it is desirable that the OFF period is set to be slightly longer than the ON period, such as 48% for the ON period of each pixel in the frame and 52% for the OFF period.

According to such a configuration, even in the event that each pixel is fixed, it is possible to extremely reduce the possibility that each pixel is fixed in the ON period, that is, it is possible to extremely reduce the possibility that a luminescent spot defect occurs. Therefore, it is possible to prevent a person who visually recognizes the head-up display apparatus from decreasing his/her concentration on driving by keeping close watch on the luminescent spot defect (display).

Also, for the same reason, it is desirable that the non-display period Fb in the frame is set to be longer than the display period Fa.

Hereafter, a description will be given, referring to FIGS. 11 to 20, of modification examples of this embodiment.

Second Embodiment

Figure 11:
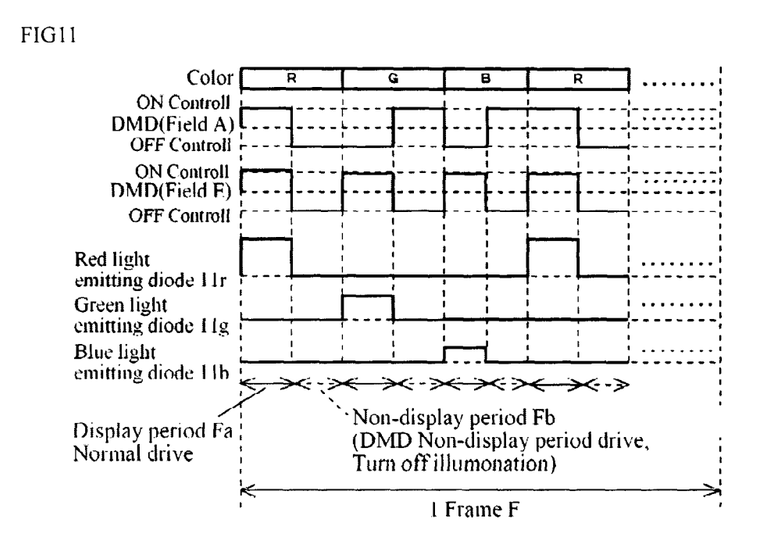
FIG. 11 is an illustrative time chart of a non-display period of a second embodiment.

In the heretofore described embodiment, the display period Fa is provided in the first half of the frame F, while the non-display period Fb is provided in the second half of the frame F, but this not being limiting, the non-display period Fb may be provided in each sub-frame SF, as shown in FIG. 11.

Third Embodiment

Figure 12:
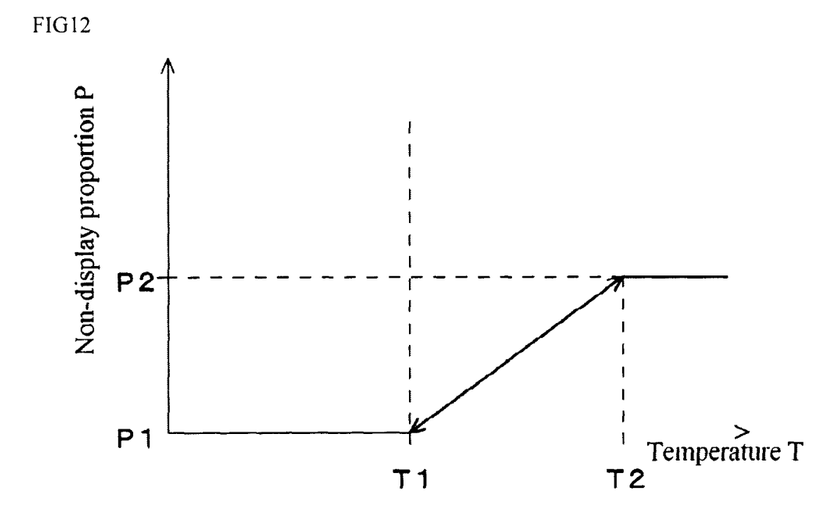
FIG. 12 is a control characteristic diagram of a non-display period and temperature data of a third embodiment.
Figure 13:
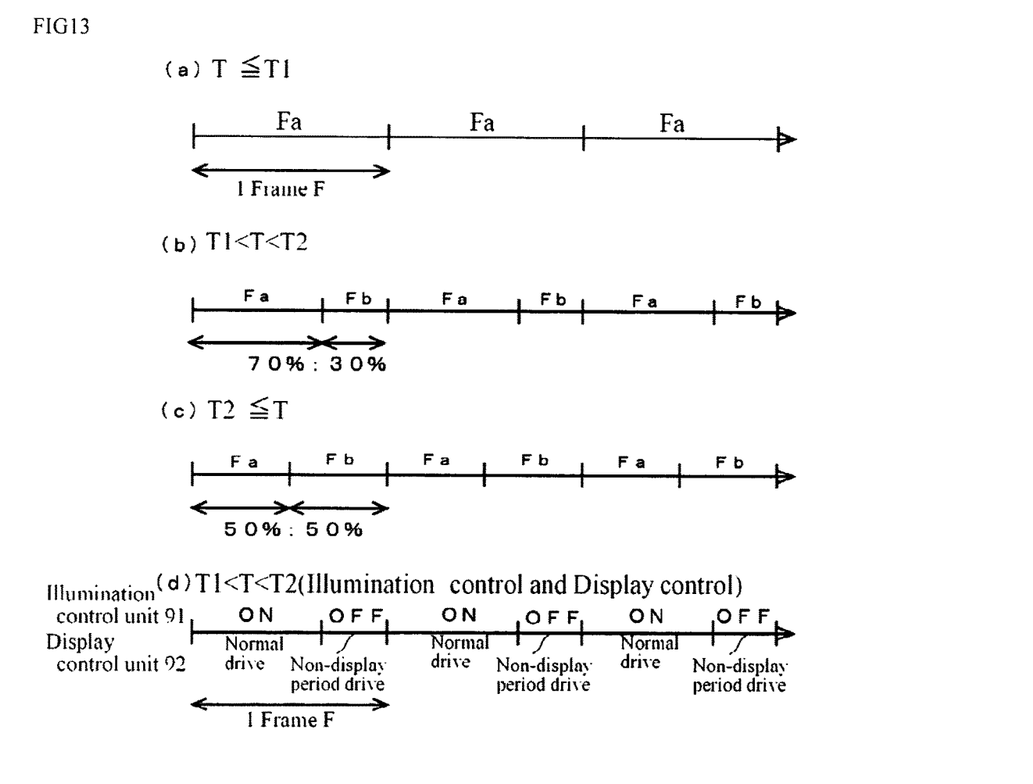
FIG. 13 illustrates the non-display period of the third embodiment.

The control unit 90, based on control characteristics wherein the non-display proportion P and temperature data T are correlated in advance, causes the non-display proportion P to change gradually based on the temperature data T, as shown in FIGS. 12 and 13.

In the first or second embodiment, there has been fear that when the temperature data T are equal to or more than the first threshold T1, the non-display proportion P changes drastically from 0% (R1) to 50% (R), due to which the display luminance of the display apparatus changes drastically from 100% to 50%, thus giving the vehicle operator 250 a feeling of strangeness.

In the third embodiment, however, as the display luminance also changes gently by causing the non-display proportion P to change gradually based on the previously mentioned control data, it is possible to reduce a feeling of strangeness due to a change in the display luminance visually recognized by the vehicle operator 250.

Fourth Embodiment

Figure 14:
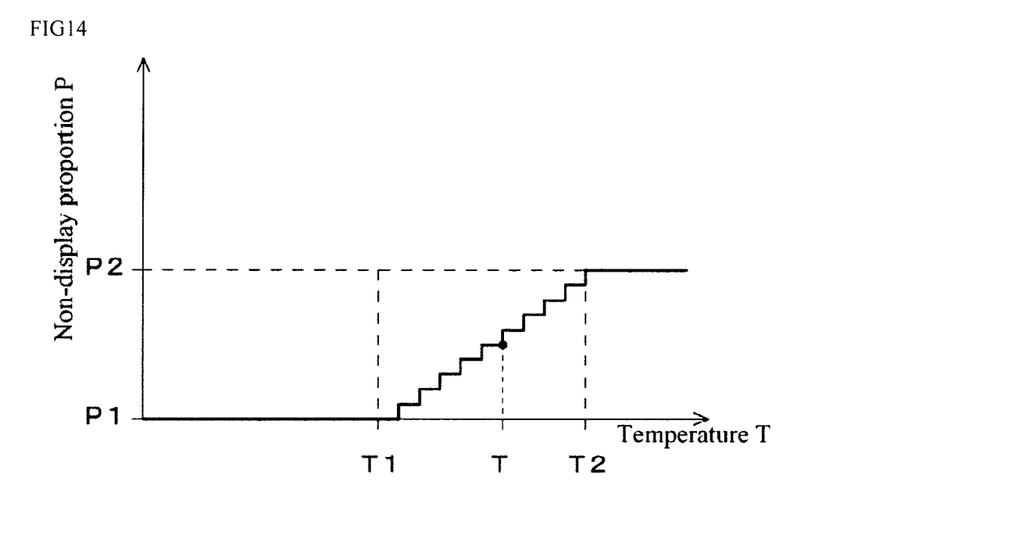
FIG. 14 is a control characteristic diagram of a non-display period and temperature data of a fourth embodiment.

Also, the control characteristics of the heretofore described embodiment are such that the non-display proportion P is caused to change continuously based on the temperature data T, as shown in FIG. 12, but the non-display proportion P may be caused to change in stages, as shown in FIG. 14.

Fifth Embodiment

Figure 15:
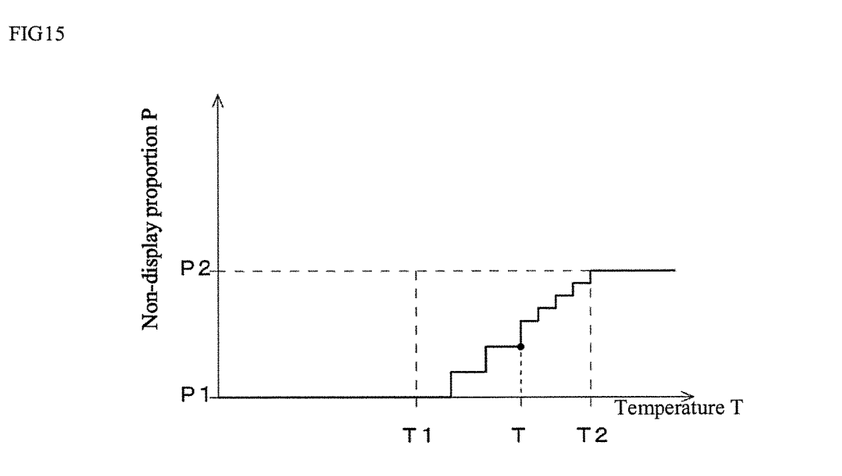
FIG. 15 is a control characteristic diagram of a non-display period and temperature data of a fifth embodiment.

Also, a detected temperature switching width may be made different between in the decreasing direction, and in the increasing direction, of the temperature data T, as shown in FIG. 15.

Sixth Embodiment

Also, a description will be given, using FIGS. 16 and 17, of a Sixth embodiment.

Figure 16:
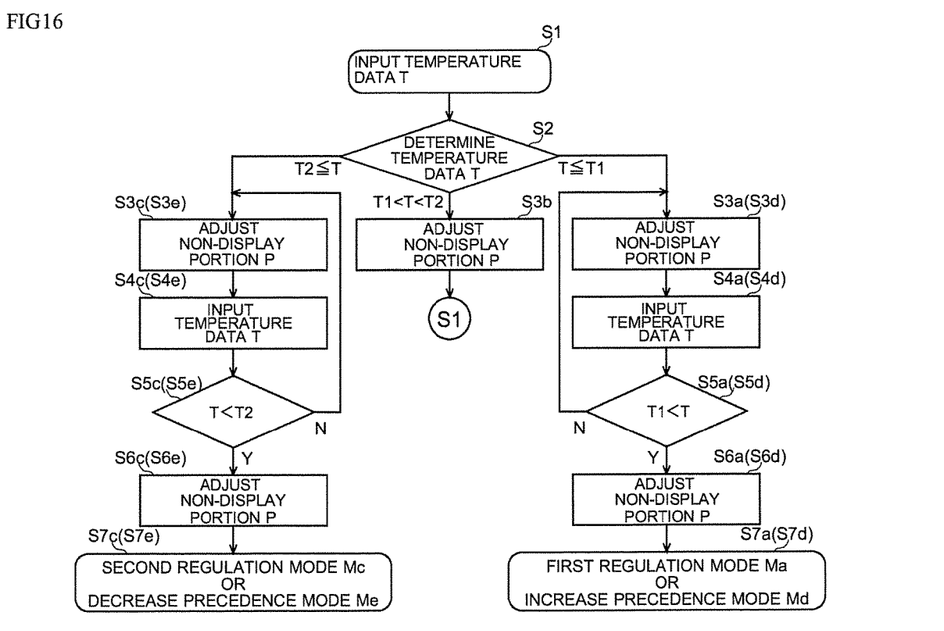
FIG. 16 is a flowchart based on a temperature change of sixth and ninth embodiments.
Figure 17:
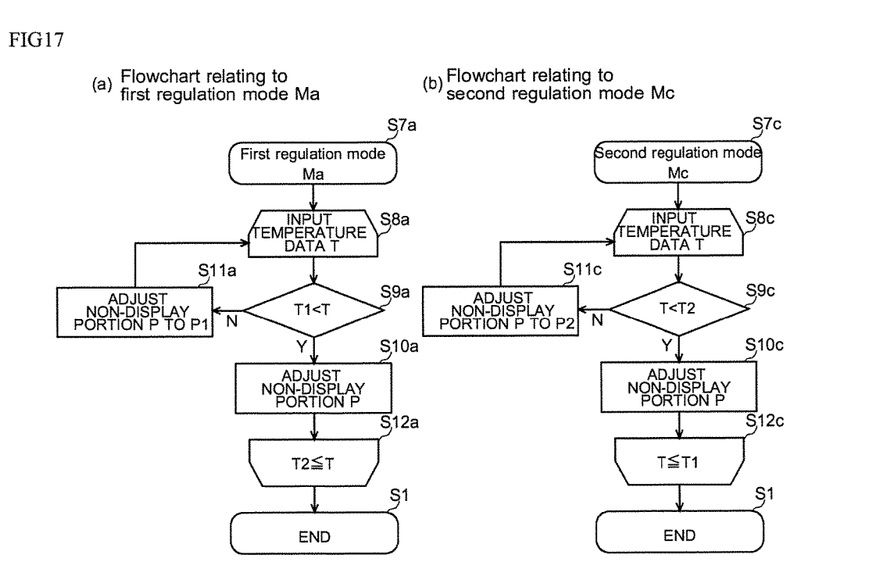
FIG. 17 shows flowcharts based on a temperature change of the sixth embodiment (first and second regulation modes).

FIG. 16 is a flowchart relating to a control of the non-display proportion P based on the temperature data T, and FIG. 17 is a flowchart relating to (a) a first regulation mode Ma and (b) a second regulation mode Mc, to be described hereafter.

Firstly, (S1) the control unit 90 inputs the temperature data T from the temperature detection means 40.

(S2) The control unit 90 determines the temperature data T.

(S3a) When the temperature data T are T≤T1 (the first threshold), the non-display portion P is adjusted based on the control characteristics. (S4a) Subsequently, the temperature data T are newly input.

(S5a) The control unit 90 determines the temperature data T. (T1<T) (S6a) When the temperature data T are T1<T, the non-display proportion P is adjusted based on the control characteristics.

(S7a) The mode is switched to the first regulation mode Ma. (S8a) The temperature data T are newly input. (S9a) The control unit 90 determines the temperature data T. (T1<T)

(S10a) When the temperature data T are T1<T, the non-display proportion P is adjusted based on the control characteristics. (S11a) When the temperature data T are T≤T1, the non-display proportion P is adjusted to a first threshold non-display proportion P1 based on the control characteristics. (S12a) S8a to S12a are repeated until T2≤T. When T2≤T, the first regulation mode Ma is finished.

Also, with regard to the second regulation mode Mc, as the control therein is similar to that in the first regulation mode Ma, a description will be omitted.

According to such a configuration, it is possible to reduce a fluctuation of the display luminance due to a fluctuation of the temperature data T in the vicinity of the thresholds.

Seventh Embodiment

Furthermore, as the seventh embodiment, the control unit 90, in addition to the controls based on the first threshold T1 and second threshold T2, carries out controls based on a preset predetermined third threshold T3 which is equal to or more than the first threshold T1 and less than the second threshold T2 and on a preset predetermined fourth threshold T4 which is equal to or less than the first threshold T1. The control unit 90, when it is determined that the temperature data T, when increasing, are equal to or more than the first threshold T1, adjusts the non-display proportion P based on the control characteristics, and when it is determined that the temperature data T are equal to or more than the second threshold T2, adjusts the non-display proportion P to the second threshold non-display proportion P2.

Also, the control unit 90, when it is determined that the temperature data T, when decreasing, are equal to or less than the third threshold T3, adjusts the non-display proportion P based on the control characteristics, and when it is determined that the temperature data T are equal to or less than the fourth threshold T4, adjusts the non-display proportion P to the first threshold non-display proportion P1.

Figure 18:
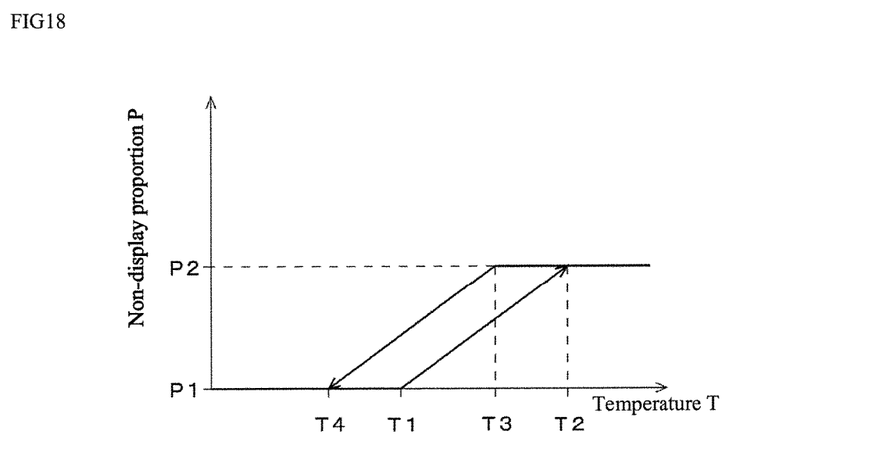
FIG. 18 is a control characteristic diagram of a non-display period and temperature data of a seventh embodiment (a hysteresis control).

That is, in the seventh embodiment, the control unit 90 includes hysteresis control characteristics wherein the locus of the temperature increase precedence drive control characteristics described in the seventh embodiment is made different from the locus of temperature decrease precedence drive control characteristics. (FIG. 18)

By providing the control unit 90 with the hysteresis control characteristics in this way, it is possible to reduce the fluctuation of the display luminance due to the fluctuation of the temperature data T in the vicinity of the thresholds.

Figure 19:
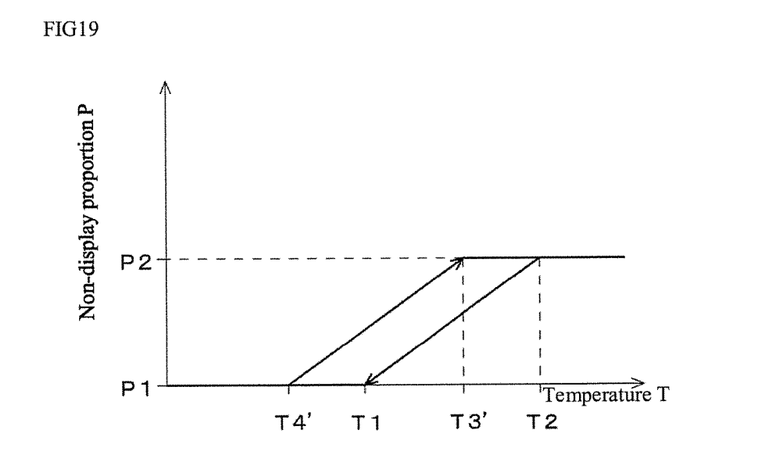
FIG. 19 is a flowchart based on a temperature change of an eighth embodiment (a loop control).

Also, as it is sufficient that a hysteresis control can be performed in the way heretofore described, the thresholds may be loop controlled in such a way as T4'→T3'→T2→T1→. (Eighth Embodiment) (FIG. 19)

Ninth Embodiment

Also, a description will be given, using FIGS. 16 and 20, of a ninth embodiment.

Figure 20:
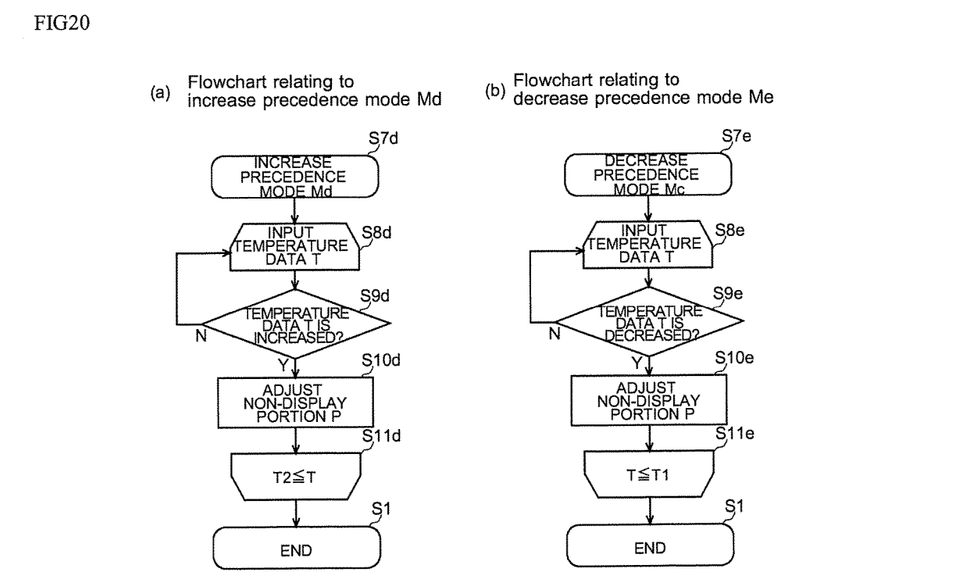
FIG. 20 shows flowcharts based on a temperature change of the ninth embodiment (increase and decrease precedence modes).

FIG. 20 is a flowchart relating to (a) an increase precedence mode Md and (b) a decrease precedence mode Me, to be described hereafter.

Firstly, (S1) the control unit 90 inputs the temperature data T from the temperature detection means 40.

(S2) The control unit 90 determines the temperature data T.

(S3d) When the temperature data T are T T1 (the first threshold), the non-display proportion P is adjusted based on the control characteristics. (S4d) Subsequently, the temperature data T are newly input.

(S5d) The control unit 90 determines the temperature data T. (T1<T) (S6d) When the temperature data T are T1<T, the non-display proportion P is adjusted based on the control characteristics.

(S7d) The mode is switched to the increase precedence mode Md. (S8d) The temperature data T are newly input. (S9d) The control unit 90 determines whether the temperature has increased. (S10d) When the temperature data T have increased, the non-display proportion P is adjusted based on the control characteristics. The non-display proportion P does not change when the temperature data T are not increased. (S11d) S8d to S11d are repeated until T2≤T. When T2≤T, the increase precedence mode Md is finished.

Also, with regard to the decrease precedence mode Me, as the control therein is similar to that in the increase precedence mode Md, a description will be omitted.

In this way, by changing the non-display proportion P to the increase precedence or decrease precedence, it is possible to reduce the fluctuation of the display luminance due to the fluctuation of the temperature data T.

In this way, according to this embodiment, by providing the non-display period Fb in the frame F period in high-temperature environment based on the temperature data T of the display element 30 output by the temperature detection means 40, it is possible to increase the life span of the display element 30, and furthermore, it is possible to make a drastic change in luminance in the vicinity of the thresholds gentle, and reduce a feeling of strangeness given to the vehicle operator due to a change in luminance.

This embodiment has been the head-up display apparatus, but the invention may be applied to a direct view type vehicular indicator such as a combination meter or a navigation device.

Also, the illumination means 11, not being limited to a light emitting diode, may be, for example, a semiconductor laser.

Also, the control unit 90 is disposed outside the housing 80, in this embodiment, but may be disposed inside the housing 80.

INDUSTRIAL APPLICABILITY

The field sequential image display apparatus according to the invention can be applied as, for example, a head-up display apparatus wherein a windshield of a vehicle or the like is irradiated with display light representing an image, and the image is visually recognized, superimposed on a background, as a virtual image, and in particular, is suitable as a field sequential image display apparatus mounted on a vehicle used in high-temperature environment.

REFERENCE SIGNS LIST

100 Head-up display apparatus (Field sequential display apparatus)
200 Windshield
250 Vehicle operator's viewpoint
300 Video signal
310 Illumination control data
320 Display control data
10 Illumination device
11 Illumination means
11r Red light emitting diode
11g Green light emitting diode
11b Blue light emitting diode
12 Circuit substrate
13 Reflection and transmission optical means
13a Reflecting plate
13b Dichroic mirror
13c Dichroic mirror
14 Luminance unevenness reduction optical means
20 Illumination optical system
30 DMD (Display element)
40 Temperature detection means
41 Temperature sensor
42 A/D converter
50 Projection optical system
60 Screen
70 Plane mirror
75 Concave mirror
80 Housing
81 Window portion
90 FPGA (Control unit)
91 Illumination control unit
92 Display control unit
R Illumination light (red)
G Illumination light (green)
B Illumination light (blue)
A Field (pixel of DMD)
E Field (pixel of DMD)
C Illumination light
D Display image
F Frame
Fa Display period
Fb Non-display period
L Display light
Ma First regulation mode
Mc Second regulation mode
Md Increase precedence mode
Me Decrease precedence mode
P Non-display proportion
P1 First threshold non-display proportion
P2 Second threshold non-display proportion
V Virtual image
SF Sub-frame
T Temperature data
T1 First threshold
T2 Second threshold
T3 Third threshold
T4 Fourth threshold

The invention claimed is:

1. A field sequential image display apparatus, comprising:
a micromirror device, having a plurality of micromirrors configured to be ON/OFF controlled;
first light source, configured to emit light towards the micromirror device with a first color;
second light source, configured to emit light towards the micromirror device with a second color;
one or more controllers, configured to:
drive the first and second light sources using a field sequential method for each of sub-frames into which a frame of a display image is time divided; and
obtain display image data of the display image, and based on the display image data, control the incline of the micromirrors,
wherein the frame includes:
a display period in which the one or more controllers cause a normal drive of the plurality of micromirrors, and drive the first and second light sources, thereby causing the micromirror device to display the display image; and
a non-display period in which the one or more controllers cause a non-display period drive of the plurality of micromirrors, and turn off the first and second light sources, thereby not causing the micromirror device to display the display image,
wherein the one or more controllers are further configured to:
calculate an ON period and an OFF period of each micromirror in the display period, and
calculate an ON period and an OFF period of each micromirror in the non-display period, based on the calculation of the ON period and the OFF period of each micromirror in the display period, and
wherein the non-display period drive is based on the calculation of the ON period and the OFF period of each micromirror in the non-display period.

2. The field sequential image display apparatus according to claim 1, wherein
the non-display period drive is such that each of the plurality of micromirrors is ON/OFF controlled in a predetermined cycle.

3. The field sequential image display apparatus according to claim 1, wherein
the non-display period drive is such that each of the plurality of micromirrors is ON/OFF controlled so that an ON period and an OFF period of each of the plurality of micromirrors in the frame are approximately equal to each other.

4. The field sequential image display apparatus according to claim 1, wherein
the non-display period drive is such that each of the plurality of micromirrors is ON/OFF controlled at an ON/OFF ratio wherein the ON/OFF ratio of each of the plurality of micromirrors in the display period is inverted.

5. The field sequential image display apparatus according to claim 1, wherein
the non-display period drive is such that an ON/OFF control in the normal drive is inverted.

6. The field sequential image display apparatus according to claim 1, further comprising:
a temperature detector that detects a temperature and outputs temperature data to the one or more controllers, wherein
when the temperature data are equal to or more than a first threshold, the display period and non-display period are provided in the frame.

7. The field sequential image display apparatus according to claim 1, wherein
the one or more controllers are configured to gradually change a non-display proportion which is the proportion of the non-display period in the frame period, in accordance with the temperature data, based on control characteristics wherein the non-display proportion and temperature data are correlated in advance.

8. The field sequential image display apparatus according to claim 1, wherein
the one or more controllers are configured to operate in a first regulation mode when the temperature data increase from equal to or less than the first threshold to equal to or more than the first threshold, and operate in a second regulation mode when the temperature data decrease from equal to or more than a second threshold higher in temperature than the first threshold to equal to or less than the second threshold, wherein
when operating in the first regulation mode, the one or more controllers do not cause the non-display proportion to decrease to less than the non-display proportion at the first threshold even when the temperature data are equal to or less than the first threshold, and
when operating in the second regulation mode, the one or more controllers do not cause the non-display proportion to increase to a value greater than the non-display proportion at the second threshold even when the temperature data are equal to or more than the second threshold.

9. The field sequential image display apparatus according to claim 8, wherein
the one or more controllers operate with hysteresis control characteristics wherein a locus of control characteristics in the first regulation mode is different from a locus of control characteristics in the second regulation mode.

10. The field sequential image display apparatus according to claim 1, wherein
the one or more controllers are configured to operate in an increase precedence mode when the temperature data increase from equal to or less than the first threshold to equal to or more than the first threshold, and operate in a decrease precedence mode when the temperature data decrease from the second threshold higher in temperature than the first threshold to equal to or less than the second threshold, wherein
when operating in the increase precedence mode, the one or more controllers cause the non-display proportion to increase based on the increase of the temperature data, and does not cause the non-display proportion to decrease even when the temperature data decrease, and
when operating in the decrease precedence mode, the one or more controllers cause the non-display proportion to decrease based on the decrease of the temperature data, and does not cause the non-display proportion to increase even when the temperature data increase.

11. The field sequential image display apparatus according to claim 1, wherein
the OFF period of each of the plurality of micromirrors in the frame is longer than the ON period of each of the micromirrors.

12. The field sequential image display apparatus according to claim 1, wherein
the non-display period is longer than the display period.

* * * * *